US012763661B2

(12) United States Patent
Shih et al.

(10) Patent No.: US 12,763,661 B2
(45) Date of Patent: Oct. 13, 2026

(54) POWER CONVERSION CIRCUIT

(71) Applicant: Quanta Computer Inc., Taoyuan City (TW)

(72) Inventors: Yu-Chuan Shih, Taoyuan City (TW); Hsin-Chih Kuo, Taoyuan City (TW)

(73) Assignee: QUANTA COMPUTER INC., Taoyuan City (TW)

( * ) Notice: Subject to any disclaimer, the term of this patent is extended or adjusted under 35 U.S.C. 154(b) by 253 days.

(21) Appl. No.: 18/647,084

(22) Filed: Apr. 26, 2024

(65) Prior Publication Data

US 2025/0202335 A1 Jun. 19, 2025

(30) Foreign Application Priority Data

Dec. 14, 2023 (TW) ................................ 112148670

(51) Int. Cl.
*G05F 1/565* (2006.01)
*H02M 1/00* (2006.01)
*H02M 3/158* (2006.01)

(52) U.S. Cl.
CPC .......... *H02M 1/0045* (2021.05); *G05F 1/565* (2013.01); *H02M 3/158* (2013.01)

(58) Field of Classification Search
CPC .. H02M 1/0045; H02M 1/0006; H02M 3/155; H02M 3/1552; H02M 3/156; H02M 3/1566; H02M 3/157; H02M 3/158; H02M 3/1582; H02M 3/1584; G05F 1/567; G05F 1/56; G05F 1/561; G05F 1/562; G05F 1/563; G05F 1/565; G05F 1/569; G05F 1/571; G05F 1/573; G05F 1/575;
(Continued)

(56) References Cited

U.S. PATENT DOCUMENTS 6,060,789 A * 5/2000 Yamaguchi ............. G06F 1/305
307/64
11,444,539 B2 9/2022 Nomiyama et al.
(Continued)

FOREIGN PATENT DOCUMENTS

TW 202109228 A 3/2021

OTHER PUBLICATIONS

Chinese language office action dated Jun. 18, 2024, issued in application No. TW 112148670.

*Primary Examiner* — Nguyen Tran
(74) *Attorney, Agent, or Firm* — McClure, Qualey & Rodack, LLP

(57) ABSTRACT

A power conversion circuit including a first input circuit, a second input circuit, a linear regulator, a switch, and a switch control circuit is provided. The first input circuit receives a first input voltage through a first input terminal. The second input circuit receives a second input voltage through a second input terminal. The first input voltage is higher than the second input voltage. The linear regulator receives the first or the second input voltage to generate an output voltage. The switch has a first terminal coupled to the first input circuit and a second terminal coupled to the second input circuit and the linear regulator. The switch control circuit outputs a control signal to open the switch after receiving the second input voltage that has reached a predetermined level, so that the linear regulator generates the output voltage according to the second input voltage.

8 Claims, 4 Drawing Sheets

(58) Field of Classification Search
CPC ........ G05F 1/5735; G05F 1/577; G05F 1/585; G05F 1/59
See application file for complete search history.

(56) References Cited

U.S. PATENT DOCUMENTS

| | | | | |
|---|---|---|---|---|
| 2011/0127984 | A1* | 6/2011 | Huang .................... | G05F 1/565 323/284 |
| 2014/0145504 | A1* | 5/2014 | Kayama .................. | H02M 1/10 307/23 |
| 2024/0427362 | A1* | 12/2024 | Panter ..................... | G05F 1/575 |

* cited by examiner

POWER CONVERSION CIRCUIT

CROSS REFERENCE TO RELATED APPLICATIONS

This application claims priority of Taiwan Patent Application No. 112148670, filed on Dec. 14, 2023, the entirety of which is incorporated by reference herein.

BACKGROUND OF THE INVENTION

Field of the Invention

The present invention relates to power conversion circuits, and, in particular, to power conversion circuits having intelligent efficiency.

Description of the Related Art

Power consumption and power conversion efficiency are necessary design considerations in electronic products, and therefore are subjected to various regulatory restrictions, such as Energy Star (E-star) or EU Energy-Related Product (ErP) Regulations.

For example, a linear regulator is often used in voltage conversion. The linear regulator will have high power consumption if the difference between the input voltage and the output voltage of the linear regulator is too large, which prevents the electronic products from complying with the specifications of the regulations. Therefore, a new solution is needed to solve the above problem.

BRIEF SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

An embodiment of the present invention provides a power conversion circuit, comprising a first input circuit, a second input circuit, a linear regulator, a switch, and a switch control circuit. The first input circuit is configured to receive a first input voltage through a first input terminal, and the second input circuit is configured to receive a second input voltage through a second input terminal, wherein the first input voltage is higher than the second input voltage. The linear regulator is configured to receive the first input voltage or the second input voltage to output an output voltage. A first terminal of the switch is coupled to the first input circuit, and a second terminal of the switch is coupled to the second input circuit and the linear regulator. The switch control circuit is configured to output a control signal to open the switch when receiving the second input voltage that reaches a predetermined level, so that the first input circuit is disconnected from the linear regulator, and the linear regulator outputs the output voltage according to the second input voltage.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION OF THE INVENTION

Figure 1:
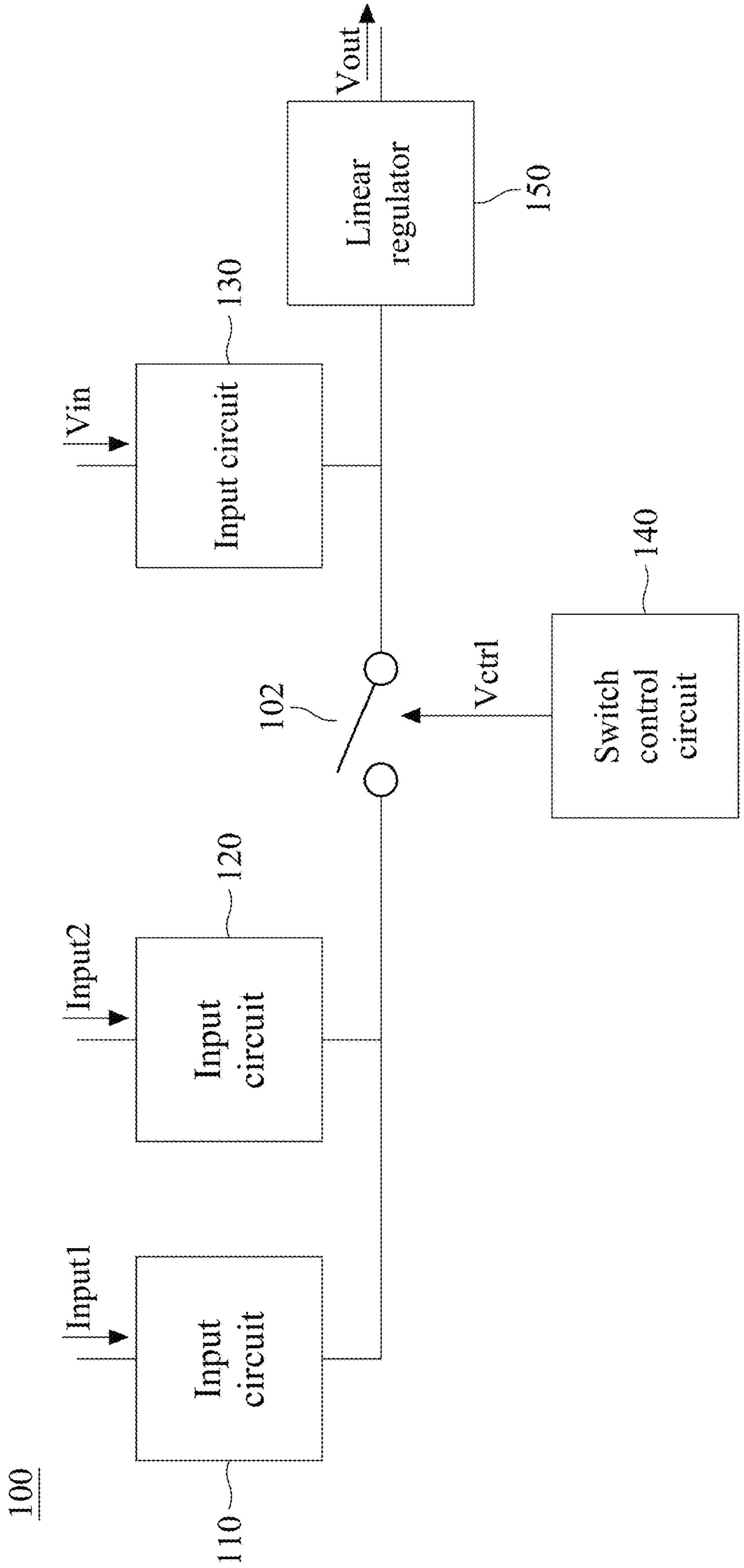
FIG. 1 is a diagram illustrating a power conversion circuit 100 according to the present disclosure.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

FIG. 1 is a diagram illustrating a power conversion circuit 100 according to the present disclosure. For example, the power conversion circuit 100 may be used in electronic devices or other systems, such as desktops or mobile devices. Referring to FIG. 1, the power conversion circuit 100 includes an input circuit 110, an input circuit 120, an input circuit 130, a switch 102, a switch control circuit 140 and a linear regulator 150.

The input circuit 110 has a first input terminal configured to receive an input voltage Input1 and a first output terminal coupled to the switch 102. In some embodiments, for example, the input voltage Input1 may be 19.5V, and the input voltage Input1 may come from a charger (e.g., a AC-DC transformer), but the present disclosure is not limited thereto. The input circuit 120 has a second input terminal configured to receive an input voltage Input2 and a second output terminal coupled to the switch 102. In some embodiments, for example, the input voltage Input2 may be 20V, and the input voltage Input2 may come from a USB Type-C charger, but the present disclosure is not limited thereto. When the switch 102 is short-circuited, the input circuit 110 or the input circuit 120 can output the input voltage Input1 or the input voltage Input2 to the linear regulator 150, so that the linear regulator 150 outputs an output voltage Vout. In the embodiments of the present disclosure, the input voltage Input1 and the input voltage Input2 are both higher than the output voltage Vout. For example but is not limited thereto, the output voltage may be 3.3V. The conversion efficiency is the output voltage of the linear regulator 150 divided by the input voltage of the linear regulator 150, which will be Vout/Input1=3.3/19.5=16.9%, or Vout/Input2=3.3/20=16.5%.

After the input voltage Input1 and/or the input voltage Input2 enters the system, the input voltage Input1 and/or the input voltage Input2 can be converted into various voltages including an input voltage Vin. For example but is not limited thereto, the input voltage Vin may be 5V. In some embodiments, the input voltage Vin may also be 3.0V, 3.3V, 12V, and is not limited thereto. When the input voltage Vin is generated in the system, the input circuit 130 may receive the input voltage Vin through a third input terminal. When the switch 102 is opened, the input circuit 110 and the input circuit 120 may be disconnected from the linear regulator 150, so that the linear regulator 150 will only receive the input voltage Vin from a third output terminal of the input circuit 130. Next, the linear regulator 150 converts the received input voltage Vin into the output voltage Vout, wherein the conversion efficiency is now Vout/Vin=3.3/5=66%.

A terminal of the switch 102 is coupled to the first output terminal of the input circuit 110 and the second output terminal of the input circuit 120, and the other terminal of the switch 102 is coupled to the third output terminal of the input circuit 130 and the input terminal of the linear regulator 150. The switch 102 is configured to receive a control signal Vctrl from the switch control circuit 140, wherein the control signal Vctrl is arranged to open or short-circuit the switch 102. When receiving the input voltage Vin that reaches a predetermined level (e.g., 5V), the switch control circuit 140 outputs the control signal Vctrl to the switch 102, so that the switch 102 is opened. However, when the input voltage Vin does not exist (e.g., the input voltage Vin is zero or does not reach a predetermined level (such as 5V)), the switch control circuit outputs the control signal Vctrl to the switch 102, so that the switch 102 is short-circuited. Thus, the input voltage of the linear regulator 150 is now the input voltage Input1 or Input2. In some embodiments, when the input voltage reaches 5V, it is determined that the input voltage Vin is created (or ready), and the switch control circuit 140 will then output the control signal Vctrl so that the switch 102 is opened. The above mechanism can prevent the switch 102 from opening before the input voltage Vin reaches a predetermined level (e.g., 5V), thereby preventing the input circuit 110 or 120 from being disconnected from the linear regulator 150 before the input voltage Vin is created (or ready), and thus preventing the linear regulator 150 from failing to perform voltage conversion since the input voltage Input1 or Input2 may not be provided to the linear regulator 150 if the input circuit 110 or 120 is disconnected from the linear regulator 150 before the input voltage Vin is created (or ready).

It should be noted that, though as shown in FIG. 1, the power conversion circuit 100 includes the input circuit 110 and the input circuit 120, the power conversion circuit 100 may include only one of the input circuit 110 and the input circuit 120, or may include two or more input circuits. That is, the power conversion circuit 100 may operate normally when having only one of the input voltages Input1 and Input2, or when having more than two input voltages. Additionally, for example, the linear regulator 150 may be a low dropout linear regulator (LDO), but is not limited thereto.

Figure 2:
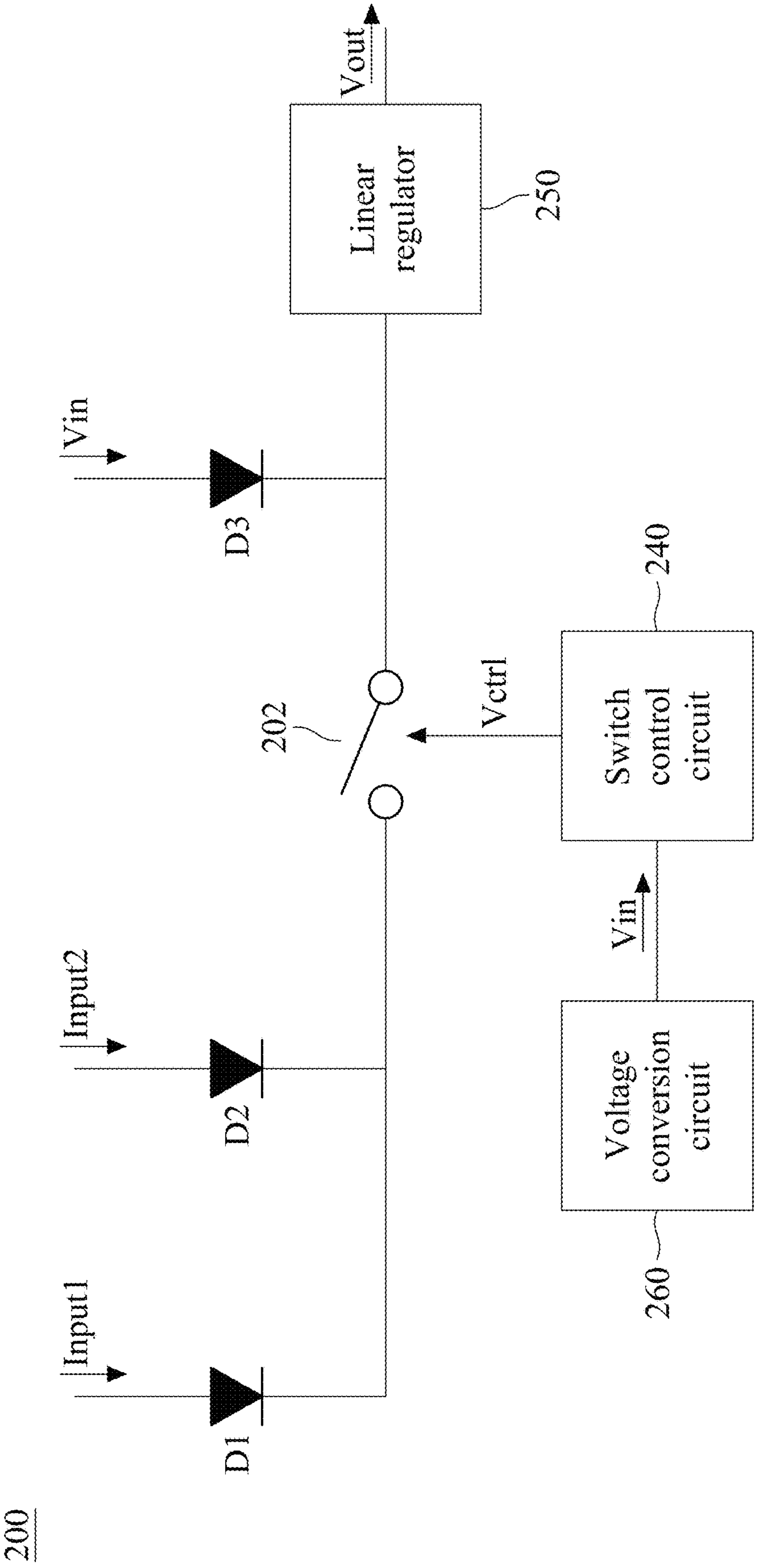
FIG. 2 is a diagram illustrating a power conversion circuit 200 according to the present disclosure.

FIG. 2 is a diagram illustrating a power conversion circuit 200 according to the present disclosure. Similar to the power conversion circuit 100, the power conversion circuit 200 may be used in electronic devices or other systems, such as desktops or mobile devices. Referring to FIG. 2, the power conversion circuit 200 includes a diode D1, a diode D2, a diode D3, a switch 202, a voltage conversion circuit 260, a switch control circuit 240, and a linear regulator 250.

The diode D1 and the diode D2 are similar to the input circuit 110 and the input circuit 120 in FIG. 1, respectively. An anode of the diode D1 is configured to receive the input voltage Input1, and a cathode of the diode D1 is coupled to the switch 202. An anode of the diode D2 is configured to receive the input voltage Input2, and a cathode of the diode D2 is coupled to the switch 202. When the switch 202 is short-circuited, the diode D1 or D2 may output the input voltage Input1 or Input2 to the linear regulator 250, so that the linear regulator 250 generates the output voltage Vout. Similar to the power conversion circuit 100 in FIG. 1, the input voltages Input1 and Input2 are both higher than the output voltage Vout. The conversion efficiency is the output voltage of the linear regulator 250 divided by the input voltage of the linear regulator 250, i.e., Vout/Input1=3.3/19.5=16.9%, or Vout/Input2=3.3/20=16.5%.

The difference between the power conversion circuit 100 and the power conversion circuit 200 is the voltage conversion circuit 260. When the input voltage Input1 and/or the input voltage Input2 enters the system, the input voltage Input1 and/or the input voltage Input2 can be converted into various voltages including the input voltage Vin converted by the voltage conversion circuit 260. For example but is not limited thereto, similar to the power conversion circuit 100, the input voltage Vin may be 5V. When the input voltage Vin is generated by the voltage conversion circuit 260, the voltage conversion circuit 260 outputs the input voltage Vin to an anode of the diode D3 and the switch control circuit 240. When the switch 202 is opened, the input circuit 210 and 220 can be disconnected from the linear regulator 250, so that the linear regulator 250 only receives the input voltage Vin from a cathode of the diode D3. Then, the linear regulator 250 converts the received input voltage Vin into the output voltage Vout, wherein the conversion efficiency is now Vout/Vin=3.3/5=66%.

A terminal of the switch 202 is coupled to the cathodes of the diode D1 and D2, and the other terminal of the switch 202 is coupled to the cathode of the diode D3 and an input terminal of the linear regulator 250. Similar to the power conversion circuit 100, the switch control circuit 240 outputs the control signal Vctrl to the switch 202, so that the switch 202 can be opened or short-circuited. When receiving the input voltage Vin from the voltage conversion circuit 260 and the input voltage Vin reaches a predetermined level, the switch control circuit 260 outputs the control signal Vctrl to the switch 202, so that the switch 202 can be opened. However, when the input voltage Vin does not exist (e.g., when the input voltage Vin is zero or does not reach a predetermined level), the switch control circuit 240 outputs the control signal Vctrl to the switch 202, so that the switch 202 can be short-circuited. This changes the input voltage of the linear regulator 250 from the input voltage Vin to the input voltage Input1 or Input2. Similar to the power conversion circuit 100, only when the input voltage Vin is created or ready (e.g., reaches 5V), the switch control circuit 240 may output the control signal Vctrl to open the switch 202. The above mechanism can prevent the linear regulator 250 from failing to perform voltage conversion by preventing the diode D1 and D2 from disconnecting from the liner regulator 250 and causing the input voltage Input1 or Input2 to not be provided to the linear regulator 250.

It should be noted that, though as shown in FIG. 2, the power conversion circuit 200 has the diodes D1 and D2, the power conversion circuit 200 may only have one of the diodes D1 and D2, or have two or more diodes as input circuits. That is, the power conversion circuit 200 may operate normally when having only one of the input voltages Input1 and Input2, or when having more than two input voltages. Additionally, though as shown in FIG. 2, the voltage conversion circuit 260 is separated from the switch control circuit 240, the voltage conversion circuit 260 may be located in the switch control circuit 240 in some embodiments. Further, for example and is not limited thereto, the linear regulator 250 can be a LDO, and the voltage conversion circuit 260 can be a pulse width modulation converter.

Figure 3:
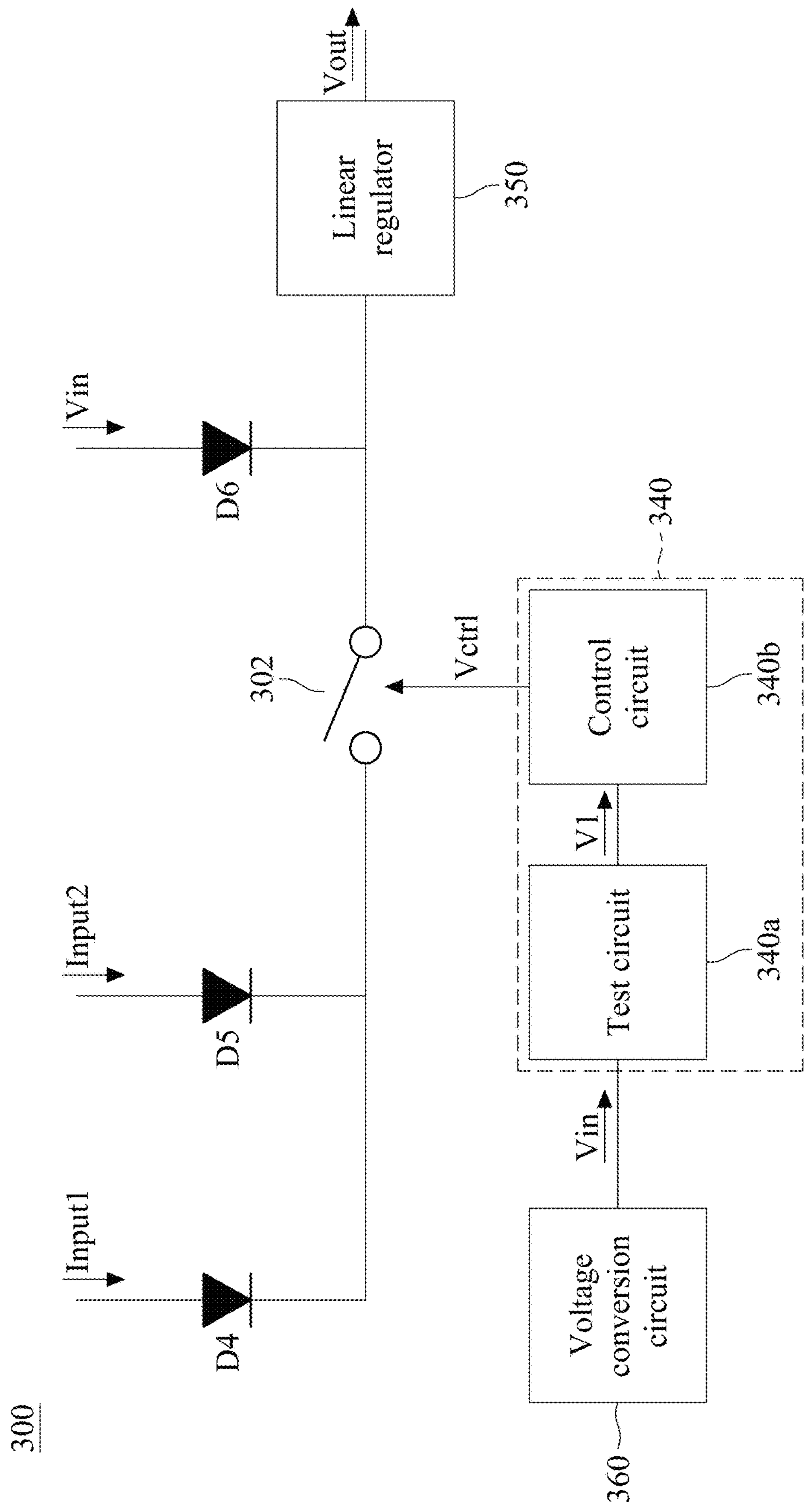
FIG. 3 is a diagram illustrating a power conversion circuit 300 according to the present disclosure.

FIG. 3 is a diagram illustrating a power conversion circuit 300 according to the present disclosure. Similar to the power conversion circuit 200, the power conversion circuit 300 may be used in electronic devices or other systems, such as desktops or mobile devices. Referring to FIG. 3, the power conversion circuit 300 includes a diode D4, a diode D5, a diode D6, a switch 302, a voltage conversion circuit 360, a switch control circuit 340, and a linear regulator 350. The connections and operations of the diodes D4, D5, and D6, the switch 302, and the linear regulator 350 are similar to the diodes D1, D2, and D3, the switch 202 and the linear regulator 250 in FIG. 2, thus for the purpose of brevity and clarity, these connections and operations will not be described again herein.

When the input voltage Input1 and/or the input voltage Input2 enters the system, the input voltage Input1 and/or the input voltage Input2 can be converted into various voltages including the input voltage Vin converted by the voltage conversion circuit 360. For example but is not limited thereto, similar to the power conversion circuit 200, the input voltage Vin may be 5V.

The difference between the power conversion circuit 200 and the power conversion circuit 300 is the switch control circuit 340. Comparing to the switch control circuit 240 in the power conversion circuit 200, the switch control circuit 340 further includes a test circuit 340*a* and a control circuit 340*b*. When the voltage conversion circuit 360 generates the input voltage Vin, the voltage conversion circuit 360 may output the input voltage Vin to an anode of the diode D6 and the test circuit 340*a*. After the test circuit 340*a* receives the input voltage Vin and determine that the input voltage Vin has reached a predetermined level (e.g., 5V), the test circuit 340*a* generates an enable signal V1 and outputs the enable signal V1 to the control circuit 340*b*. The control signal 340*b* outputs the control signal Vctrl to the switch 302 after receiving the enable signal V1, so that the switch 302 may be opened. Therefore, the linear regulator is disconnected from the diodes D4 and D5, so that the linear regulator 350 only receives the input voltage Vin from the cathode of the diode D6. Then, the linear regulator 350 converts the input voltage Vin into the output voltage Vout, wherein the conversion efficiency is now Vout/Vin=3.3/5=66%.

The control circuit 340*b* outputs the control signal Vctrl to the switch 302, so that the switch 302 is opened or short-circuited. When the control circuit 340*b* receives the enable signal V1 from the test circuit 340*a*, the control circuit 340*b* outputs the control signal Vctrl to the switch 302 in order to open the switch 302. When the enable signal V1 does not exist (e.g., the test circuit 340*a* does not receive the input voltage Vin, or the test circuit 340*a* determines that the input voltage Vin has not reach a predetermined level), the control circuit 340*b* outputs the control signal Vctrl to the switch 302 in order to short-circuit the switch 302. The input voltage of the linear regulator 350 is now changed from input voltage Vin to input voltage Input1 or Input2. Similar to the power conversion circuit 200, the above mechanism can prevent the linear regulator 350 from failing to perform voltage conversion by preventing the diodes D4 and D5 from disconnecting from the linear regulator 350 before the input voltage Vin is created and causing the input voltages Input1 or Input2 to not be provided to the linear regulator 350.

It should be noted that, though as shown in FIG. 3, the power conversion circuit 300 has the diodes D4 and D5, the power conversion circuit 300, which is similar to the power conversion circuit 200, may have only one of the diodes D4 and D5, or have two or more diodes as input circuits. That is, the power conversion circuit 300 may operate normally when having only one of the input voltages Input1 and Input2, or when having more than two input voltages. Additionally, though as shown in FIG. 3, the voltage conversion circuit 360 is separated from the switch control circuit 340, the voltage conversion circuit 360 may be located in the switch control circuit 340. Further, for example, the linear regulator 350 may be a LDO, and the voltage conversion circuit 360 may be a pulse width modulation converter.

Figure 4:
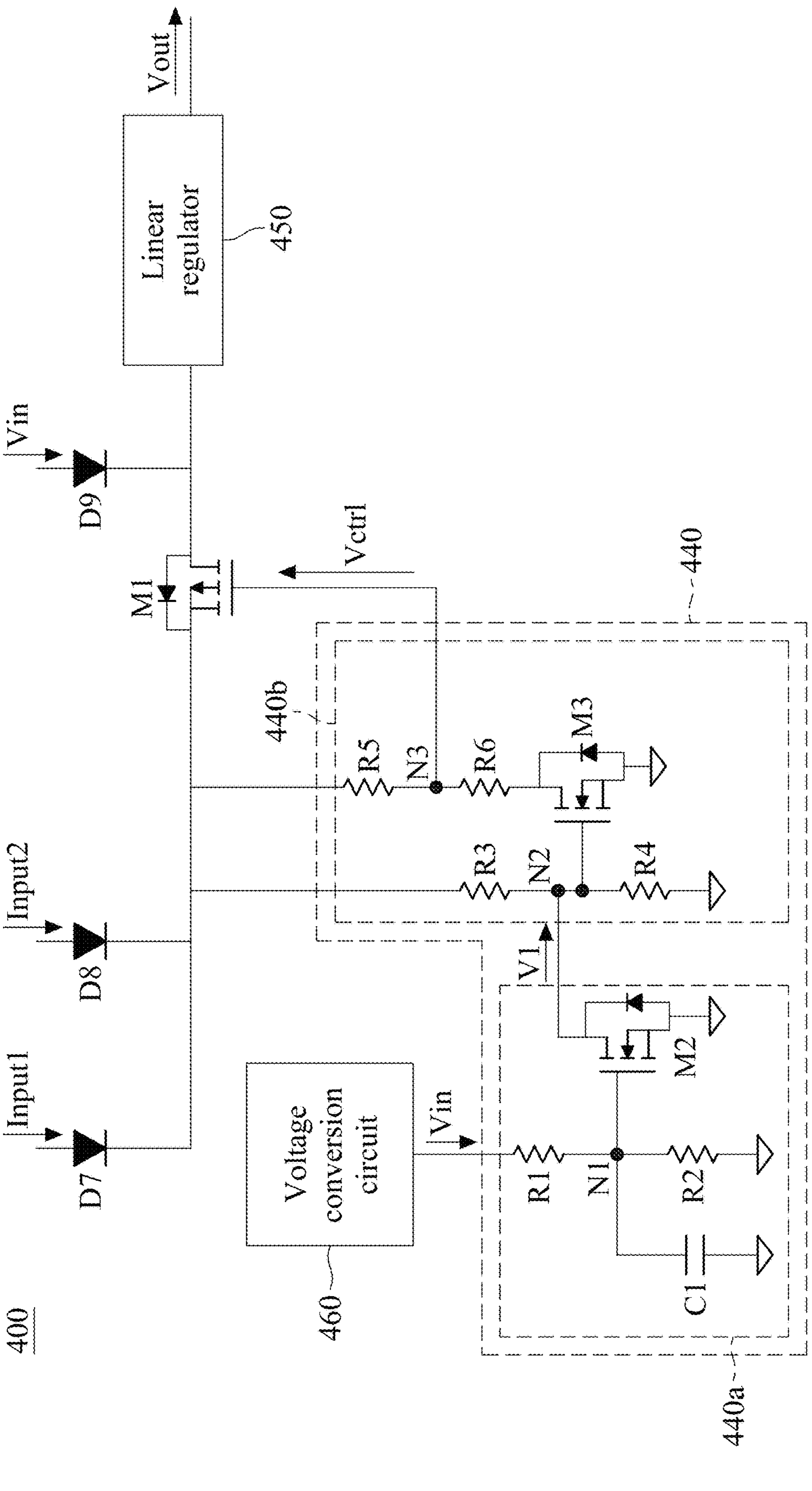
FIG. 4 is a diagram illustrating a power conversion circuit 400 according to the present disclosure.

FIG. 4 is a diagram illustrating a power conversion circuit 400 according to the present disclosure. Similar to the power conversion circuit 300, the power conversion circuit 400 may be used in electronic devices or other systems, such as desktops or mobile devices. Referring to FIG. 4, the power conversion circuit 400 includes a diode D7, a diode D8, a diode D9, a transistor M1, a switch control circuit 440, a linear regulator 450, and a voltage conversion circuit 460. The operations and connections of the diodes D7, D8, and D9 and the linear regulator 450 are similar to the diodes D4, D5, and D6 and the linear regulator 350 in FIG. 3, respectively. Therefore, for the purpose of brevity and clarity, these operations and connections will not be described again herein.

When the input voltage Input1 and/or the input voltage Input2 enters the system, the input voltage Input1 and/or the input voltage Input2 can be converted into various voltages including the input voltage Vin converted by the voltage conversion circuit 460. For example but is not limited thereto, the input voltage Vin may be 5V. Similar to the switch control circuit 340 in the power conversion circuit 330, the switch control circuit 440 further includes a test circuit 440*a* and a control circuit 440*b*.

The test circuit 440*a* includes a resistor R1, a resistor R2, a capacitor C1, and a transistor M2. As shown in FIG. 4, the transistor M2 may be an N-type metal oxide semiconductor (NMOS) transistor, but is not limited thereto. In some embodiments, the transistor M2 may be any suitable switch components, such as a bipolar junction transistor (BJT), but is not limited thereto. The transistor M2 has a drain terminal coupled to a second node N2, a gate terminal coupled to a first node N1, and a source terminal coupled to a ground. The resistor R1 is coupled between the voltage conversion circuit 460 and the first node N1, the resistor R2 is coupled between the first node N1 and the ground, and the capacitor C1 is coupled between the first node N1 and the ground. When the voltage conversion circuit 460 generates the input voltage Vin, the voltage conversion circuit 460 may output the input voltage Vin to an anode of the diode D9 and the test circuit 440*a*. After the test circuit 440*a* receives the input voltage Vin, the test circuit 440*a* determines whether the input voltage Vin reaches a predetermined level (e.g., 5V). By properly adjusting the values of the resistors R1 and R2 and the capacitor C1, the enable signal V1 will be generated by the test circuit 440*a* and output to the control circuit 440*b* through the drain terminal of the transistor M2 only when the input voltage Vin reaches 5V.

As shown in FIG. 4, the control circuit 440*b* includes a resistor R3, a resistor R4, a resistor R5, a resistor R6, and a transistor M3. Similar to the transistor M2, the transistor M3 may be a NMOS transistor or any suitable switch components. The transistor M3 has a gate terminal coupled to the second node N2, a drain terminal coupled to the resistor R6, and a source terminal coupled to the ground. The resistor R3 is coupled between the second node N2 and anodes of the diodes D7 and D8, the resistor R5 is coupled between the drain terminal of the transistor M1 and a third node N3, and the resistor R6 is coupled between the third node N3 and the drain terminal of the transistor M3. After the control circuit 440*b* receives the enable signal V1 through the gate terminal of the transistor M3, the control circuit 440*b* outputs the control signal Vctrl to the gate terminal of the transistor M1. When the transistor M1 is off, the linear regulator 450 is disconnected from the diodes D7 and D8, so that the linear regulator 450 only receives the input voltage Vin from the cathode of the diode D9. Then, the linear regulator 450 converts the input voltage Vin into the output voltage Vout, wherein the conversion efficiency is now Vout/Vin=3.3/5=66%.

Still referring to FIG. 4, the transistor M1 has a source terminal coupled to the cathodes of the diodes D7 and D8, a drain terminal coupled to the cathode of the diode D9 and the input terminal of the linear regulator 450, and a gate terminal coupled to the third node N3. The control circuit 440*b* outputs the control signal Vctrl to the gate terminal of the transistor M1 to turn on or turn off the transistor M1. When the control circuit 440*b* receives the enable signal V1 from the test circuit 440*a*, the control circuit 440*b* outputs the control signal Vctrl to the gate terminal of the transistor M1 to turn off the transistor M1. However, when the enable signal V1 does not exist (e.g., the test circuit 440*a* does not receive the input voltage Vin or the test circuit 440*a* determines that the input voltage Vin does not reach a predetermined level), the control circuit 440*b* outputs the control signal Vctrl to the gate terminal of the transistor M1 to turn on the transistor M1. The input voltage of the linear regulator 450 is now change from input voltage Vin to the input voltage Input1 or Input2.

Still referring to FIG. 4, the voltage conversion circuit 460 generates the input voltage Vin and outputs the input voltage Vin to the anode of the diode D9 and a terminal of the resistor R1. By properly adjusting the values of the resistors R1, R2 and the capacitor C1, sufficient voltage division can be created at the first node N1 when the input voltage Vin is created or ready (e.g., reaches 5V), so that the transistor M2 may turn on and short-circuit its drain terminal and its source terminal. The voltage at the second node N2 is now the voltage of the ground. Therefore, the transistor M3 is turned off, so that an open circuit is formed between the drain terminal and the source terminal of the transistor M3, causing the voltage at the third node N3 to rise until the voltage at the third node N3 is high enough to turn off the transistor M1, and thus forming an open circuit between the drain terminal and the source terminal of the transistor M1. The voltage that the linear regulator 450 receives is now the input voltage Vin from the diode D9.

That is, the voltage conversion circuit 460 outputs the input voltage Vin to the anode of the diode D9 and a terminal of the resistor R1 (i.e., outputs the input voltage Vin to the test circuit 440*a*), so that the transistor M2 is turned on and the voltage at the second node N2 is dropped to the voltage of the ground (i.e., the test circuit 440*a* outputs the enable signal V1 to the control circuit 440*b* when the input voltage Vin reaches a predetermined level). Therefore, the transistor M3 is turned off and the voltage at the third node N3 rises above the voltage which the transistor M1 needs to turn on (i.e., the control circuit 440*b* outputs the control signal Vctrl to the transistor M1), so that the transistor M1 is turned off, and the linear regulator 450 now only receives the input voltage Vin from the diode D9.

On the other hand, when the test circuit 440 does not receive the input voltage Vin, or the input voltage Vin is not created or ready (i.e., the voltage conversion circuit 460 does not output or stop outputting the input voltage Vin, or the input voltage Vin does not reach 5V), the transistor M2 will not turn on. By properly adjusting the values of the resistors R3 and R4, a sufficient voltage division is created at the second node N2 to turn on the transistor M3. Likewise, by properly adjusting the values of the resistors R5 and R6, a sufficient voltage division is created at the third node N3 to turn on the transistor M1. The voltage received by the linear regulator 450 now is the input voltage Input1 or Input2 from the diode D7 or D8.

It should be noted that, though as shown in FIG. 4, the power conversion circuit 400 has the diodes D7 and D8, the power conversion circuit 400, similar to the power conversion circuit 300, may have only one of the diodes D7 and D8, or have two or more diodes as input circuits. That is, the power conversion circuit 400 may operate normally when having only one of the input voltage Input1 and Input2, or when having more than two input voltages. Additionally, though the voltage conversion circuit 460 and the switch control circuit 440 is separated as shown in FIG. 4, the voltage conversion circuit 460 may be located in the switch control circuit 440. Further, for example, the linear regulator 450 may be a LDO, and the voltage conversion circuit 460 may be a pulse width modulation converter.

The present disclosure provides a novel power conversion circuit that can reduce the gap between the input voltage and the output voltage of a linear regulator by using MOS transistors as switches, and thus may achieve the purpose of reducing the power consumption of the voltage conversion without relying too much on software or firmware settings. Additionally, when the input voltage is interrupted or not ready, the power conversion circuit provided in the present disclosure may connect the input of the linear regulator back to the system voltage, preventing the linear regulator from failing to perform voltage conversion when there is no input voltage. Moreover, since the embodiments of the present disclosure may have one or more input circuits (which, in some embodiments, may be diodes) and one or more input voltages, the embodiments of the present disclosure is suitable for usage such as systems with multiple inputs or peripheral product equipment of the systems.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above-described embodiments. Rather, the scope of the disclosure should be defined in accordance with the following claims and their equivalents.

What is claimed is:

1. A power conversion circuit, comprising:

a first input circuit, configured to receive a first input voltage through a first input terminal;

a second input circuit, configured to receive a second input voltage through a second input terminal, wherein the first input voltage is higher than the second input voltage;

a linear regulator, configured to receive the first input voltage or the second input voltage to output an output voltage;

a switch, having a first terminal and a second terminal, wherein the first terminal is coupled to the first input circuit, and the second terminal is coupled to the second input circuit and the linear regulator; and a switch control circuit, configured to output a control signal to open the switch when receiving the second input voltage that reaches a predetermined level, so that the first input circuit is disconnected from the linear regulator, and the linear regulator outputs the output voltage according to the second input voltage, wherein the switch control circuit comprises:

a test circuit, configured to output an enable signal when determining that the second input voltage has reached the predetermined level; and a control circuit, configured to receive the enable signal and output the control signal, wherein the test circuit comprises:

a first transistor, having a first source terminal, a first gate terminal, and a first drain terminal;

a first resistor, coupled between the voltage conversion circuit and a first node;

a second resistor, coupled between the first node and a ground; and a capacitor, coupled between the first node and the ground, wherein the first gate terminal is coupled to the first node, the first source terminal is coupled to a second node and is arranged to output the enable signal, and the first drain terminal is coupled to the ground.

2. The power conversion circuit as claimed in claim 1, further comprising:

a voltage conversion circuit, configured to convert the first input voltage into the second input voltage, and output the second input voltage to the switch control circuit.

3. The power conversion circuit as claimed in claim 1, wherein the control circuit comprises:

a second transistor, having a second gate terminal, a second source terminal, and a second drain terminal;

a third resistor, coupled between the first terminal of the switch and the second node;

a fourth resistor, coupled between the second node and the ground;

a fifth resistor, coupled between the first terminal of the switch and a third node; and a sixth resistor, coupled between the third node and the second source terminal, wherein the second gate terminal is coupled to the second node and is arranged to receive the enable signal, and the second drain terminal is coupled to the ground.

4. The power conversion circuit as claimed in claim 3, wherein the switch can be a PMOS transistor having a gate terminal coupled to the third node and is arranged to receive the control signal.

5. The power conversion circuit as claimed in claim 1, wherein:

the first input circuit is a first diode, wherein an anode of the first diode is configured as the first input terminal, and a cathode of the first diode is coupled to the first terminal of the switch; and the second input circuit is a second diode, wherein an anode of the second diode is configured as the second input terminal, and a cathode of the second diode is coupled to the second terminal of the switch.

6. The power conversion circuit as claimed in claim 1, wherein the linear regulator is a low dropout linear regulator.

7. The power conversion circuit as claimed in claim 1, further comprising:

a third input circuit, configured to receive a third input voltage through a third input terminal, wherein the first input voltage is higher than the third input voltage, and the third input voltage is higher than the second input voltage.

8. The power conversion circuit as claimed in claim 1, wherein when the second input voltage is interrupted or has not reached the predetermined level, the switch control circuit short-circuits the switch to reconnect the first input circuit and the linear regulator, so that the linear regulator outputs the output voltage according to the first input voltage.

* * * * *